United States Patent [19]

Dunphy et al.

[11] Patent Number: 4,653,906
[45] Date of Patent: Mar. 31, 1987

[54] SPATIALLY RESOLVING FIBER-OPTIC CROSSTALK STRAIN SENSOR

[75] Inventors: James R. Dunphy, Manchester; Gerald Meltz, Avon, both of Conn.; Elias Snitzer, Wellesley, Mass.

[73] Assignee: United Technologies Corporation, Hartford, Conn.

[21] Appl. No.: 640,491

[22] Filed: Aug. 13, 1984

[51] Int. Cl.⁴ ............................................. G01B 11/16
[52] U.S. Cl. ...................................... 356/32; 250/227
[58] Field of Search ............................ 356/32; 250/227

[56] References Cited

U.S. PATENT DOCUMENTS 4,295,738 10/1981 Meltz et al. ............................ 356/32
4,298,794 11/1981 Snitzer et al. ......................... 250/227

OTHER PUBLICATIONS

S. K. Yao et al., *Applied Optics*, vol. 21, pp. 3059–3060, (1982).

*Primary Examiner*—Vincent P. McGraw
*Attorney, Agent, or Firm*—Peter R. Ruzek; Robert P. Sabath

[57] ABSTRACT

An optical strain measuring arrangement including an optical waveguide comprising first and second cores fixedly mounted with respect to a mechanical structure to be monitored, and a detection system for relating the contrast in light intensity emerging from said cores to a range of wavelengths to establish an indication of strain along the range of the optical waveguide.

2 Claims, 4 Drawing Figures

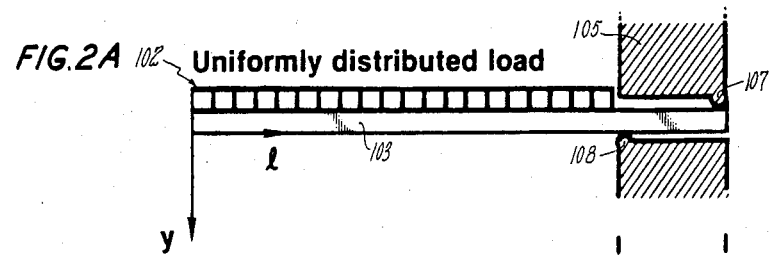
FIG. 2A
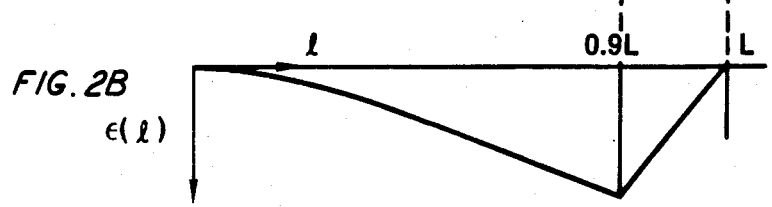
FIG. 2B
FIG. 3
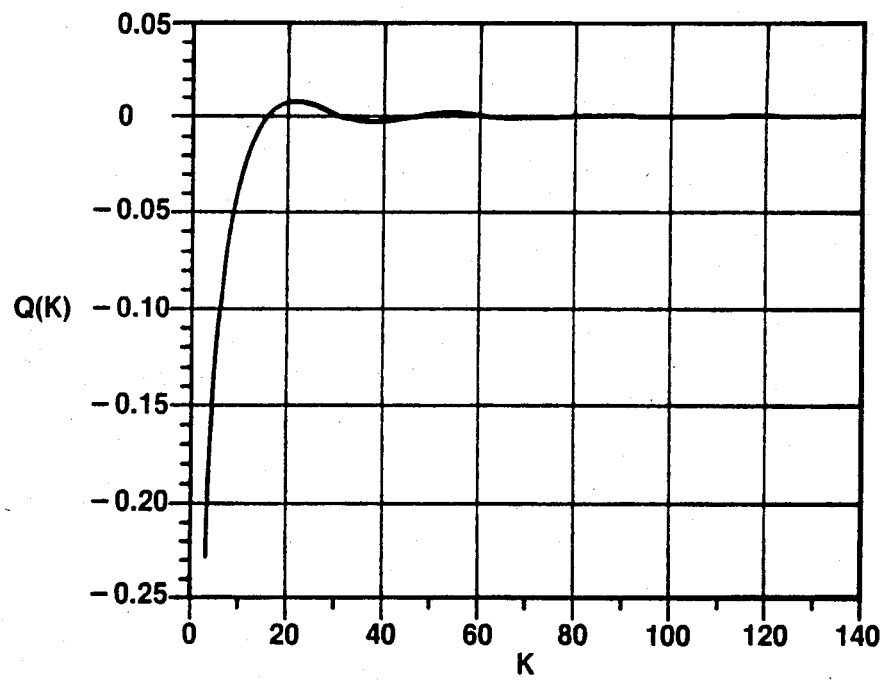

SPATIALLY RESOLVING FIBER-OPTIC CROSSTALK STRAIN SENSOR

The Government has rights in this invention pursuant to Contract No. F08635-83-C-0287 awarded by the Department of the Air Force.

DESCRIPTION

1. Technical Field

This invention relates to the optical detection and measurement of strain distributions in mechanical structures such as, for example, airframes made of composite materials and perhaps subject to high temperatures and a harsh electromagnetic interference environment.

2. Background of the Invention

Fiber optic strain sensors including coupled core fiber optic strain sensors have been fabricated and tested in the past. In such sensors, strain-induced crosstalk changes due to longitudinal perturbations have been noted in accordance with coupled mode and integral representation theories.

Such sensors however, have been employed only to measure total strain over the entire length of the sensing device. This is not effective for producing spacially-resolved strain indications.

In order to measure strain at a wide variety of locations, a large number or network of short sensors is needed.

Further, short sensor devices such as those employed in networks are themselves subject to difficult problems in the implementation, for example the attachment of input and output coupling fibers.

For further background regarding multiple core fiber optic strain sensors, see U.S. Pat. No. 4,295,738 (1981) to Gerald Meltz and Elias Snitzer. This patent is thereby expressly referred to and incorporated herein by reference. Among other information contained therein, the patent provides a useful discussion of the "crosstalk" phenomenon in which adjacent fiber cores in a common cladding alternate in transmitting light initially launched into both cores.

Of additional useful background is the concept of beat length, represented for example by the symbol lambda$_b$. This term is defined as the length of optical fiber required for crosstalk to be accomplished completely from one core to an adjacent core and back again. As is well known, beat length is a function of temperature, wavelength, strain and pressure.

DISCLOSURE OF THE INVENTION

According to the invention, multiwavelength light is launched into one end of a multiple core optical waveguide imbedded in or otherwise coupled to a mechanical structure to be monitored for strain. At the output of the waveguide the light from the various cores is detected and analyzed for contrast as a function of wavelength, indicating thereby the location and intensity of strain in the mechanical system along the path of the waveguide.

BRIEF DESCRIPTION OF THE DRAWING

FIGS. 2A and 2B are respectively a schematic diagram of the mechanical system (i.e. a cantilevered beam) which can be subject to strain measurement according to the inventive concept taught herein, and a moment diagram illustrating the strain function as a function of distance along the beam extending even into its supporting wall structure; and FIG. 3 is a graph of the crosstalk spectrum according to the beam system optically monitored in accordance with the detection arrangement according to the invention herein, in particular displaying the contrast function "Q" over a range of injected or launched light wavelengths.

BEST MODE FOR CARRYING OUT THE INVENTION

Figure 1:
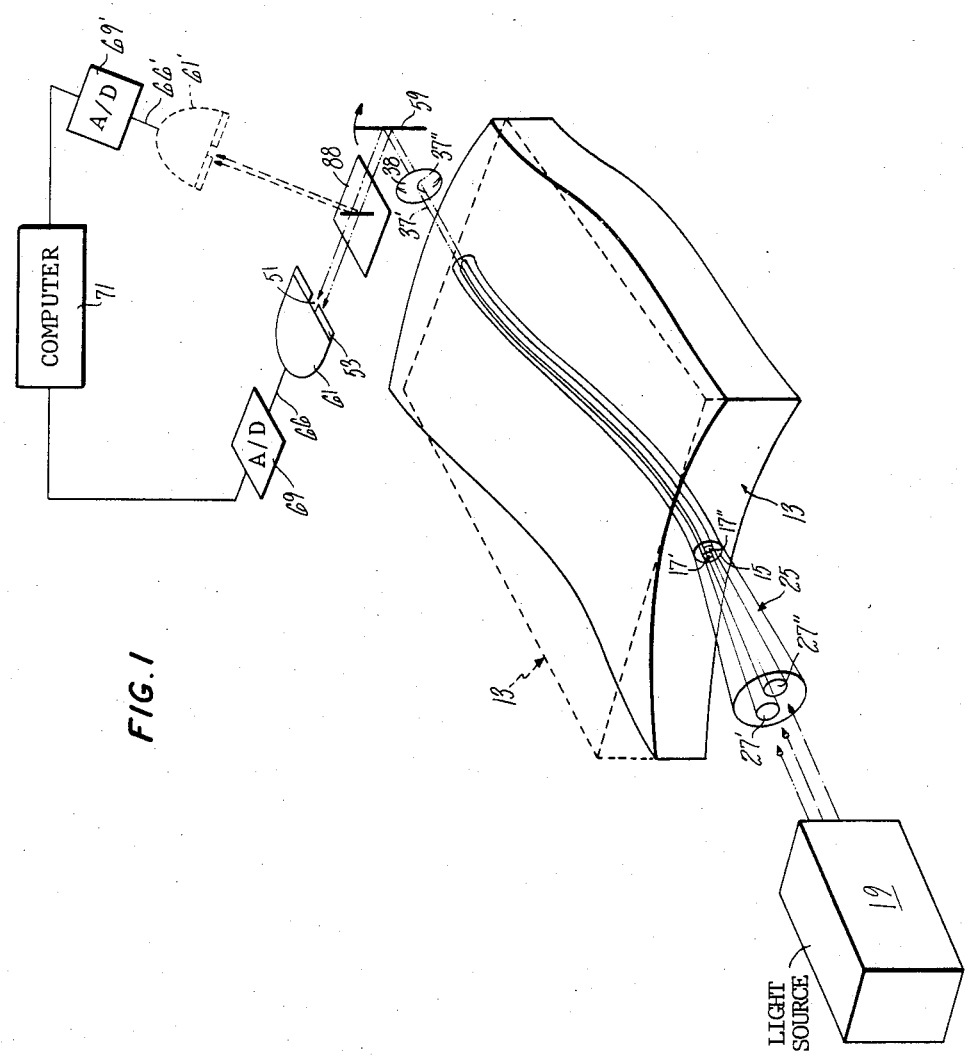
FIG. 1 is a schematic illustrating a strain sensing arrangement according to one version of the invention addressed herein.

FIG. 1 shows a preferred mode for carrying out the invention, in which a mechanical structure 13 or portion thereof is subject to strain analysis, measurement and detection along the path of an optical waveguide 15 or fiber sensor having two cores 17' and 17" in this embodiment.

The cores are surrounded by a cladding material, which is typically glass or plastic. For further detail in the construction thereof, refer to U.S. Pat. No. 4,295,738, which as noted has been incorporated herein as part of the disclosure hereof.

The optical waveguide 15 can be operated according to either of at least two preferred multiple wavelength embodiments of the invention, which in turn include two preferred ways of launching light into the sensor. According to one of these preferred ways, light is injected or launched into the waveguide from a light source 19, which scans for example across a selected range of wavelengths, thus injecting a given wavelength of light into waveguide 15 at a particular time, and another wavelength thereof at a next interval or period of time. In this configuration, the detector system sequentially analyzes crosstalk as each wavelength is transmitted. In the alternative, the light source can produce light comprising an entire selected range of wavelengths continuously over time. In that case, however, the detection system to be discussed below would need to be modified to discriminate between information received over the various wavelengths, as will be seen.

Light from the multiwavelength source 19 is suitably transferred to or coupled to the waveguide cores 27' and 27". This can be accomplished with standard laboratory optics or special coupling fibers. The primary concern is efficiently to excite the cores with a suitable form of illumination, that being single mode light for one or both cores 27' and 27". One way to implement the desired coupling of light is to provide a tapered section 25 of the waveguide including cores 27' and 27" which progressively diminish in diameter until they reach dimensions conforming to diameters of cores 17' and 17". The tapered section is suitably arranged or positioned by well-known mechanical techniques to receive light generated by light source 19 or a portion thereof and to couple, launch or inject the light once modally reduced, into waveguide 15.

Mechanical structure 13 can be any kind of mechanical device or arrangement, as for example the wings of an aircraft or blades of a helicopter. The output from the waveguide 15 in mechanical structure 13 emerges in terms of two parallel beams of light 37' and 37".

According to one mode of the invention, these beams are diverted toward a narrow slit 51 defined in a mask 55, by a reflective device 59 such as, for example, a rotating mirror. Lens 38 transforms the beams to produce an image of the sensor output in the plane of the mask 55. In this manner, first one, then the other of beams 37 can be guided through slot 51 to a photodetector 61 effective for producing an electrical signal along line 66 to an analog-to-digital converter 69 in turn providing data input to a computer 71 for analysis.

In the event that light source 19 produces light across the entire selected range of wavelengths rather than scanning, a plurality of photodetectors 61 and 61' can be arranged radially outward from a wavelength analyzer 88 effective for diverting light beams 37' and 37" to the corresponding detectors 61 which are situated in the image plane of the core. Each photodetector 61' is preceded by a mask 55' defining a narrow slit 51'. Further, each photo detector 61' drives for example an analog-to-digital converter 69' in turn providing its information to computer 71. According to either of the two versions (the wavelengths being scanned individually, or injected in toto across the entire selected range), of the invention discussed immediately above, the computer receives information indicative of the levels of the two light beams 37' and 37" for a range of wavelengths of injected light. The scanned wavelength analyzer and detector system can be replaced by an unscanned analyzer accompanied by an integrated array of detectors. In this case each detector element of the array measures core power at one wavelength. The adjacent detectors in that array will then read the relative power at subsequent wavelengths. Each neighboring detector contributes to the measurement of the power versus wavelength function. At each wavelength, an image of each core is formed at an element of the detector array.

Concerning the two preferred methods of injecting light into the optic waveguide 15, one or both of the cores are illuminated with light. In the first case, both symmetric and asymmetric lowest-order modes are thereby initiated, causing crosstalk to become evident along the entire length of the waveguide 15. Changes in this steady-state crosstalk level are produced by perturbations in mechanical structure 13.

If both cores are illuminated with light at equal optical phase, however, no crosstalk is evident until the mechanical structure 13 perturbs the optical waveguide 15. When said perturbations occur, the resulting crosstalk changes are subject to analysis.

The range of wavelengths of injected light corresponds to a range of beat lengths, lambda$_b$, which have a unique and monotonic relationship to the wavelength per se. Accordingly, a range of signals indicative of several (in this case both) light beam intensities (from 37' and 37") for a range of beat lengths is received by computer 71 during operation.

By way of an example suggested with reference to FIG. 2A, if a strain is caused by uniformly distributed load 102 on a cantilevered beam 103 supported in a wall 105 including pivot points 107 and 108 acting on beam 103, two light signals of complex amplitude represented by the variables $a_1$ and $a_2$ corresponding to light beams 37' and 37" are provided to computer 71 for a variety of wavelengths.

The information accordingly provided to the computer 71 is governed by the well known relationship indicated below:

$$\begin{pmatrix} a_1(L) \\ a_2(L) \end{pmatrix} \simeq [e^{-i(B_o+K)L/\sqrt{2}}] \cdot$$

$$\begin{bmatrix} 1 - 1/K \sum_{i=1}^{\eta} E'(u_i)\Delta l_i e^{i2K(L-u_i)} \\ 1 + 1/K \sum_{i=1}^{\eta} E'(u_1)\Delta l_i e^{i2K(L-u_i)} \end{bmatrix}$$

where,
L is the length of the fiber sensor;
$a_1(L)$ is the complex amplitude of the light related to the field intensity at the end of the first core;
$a_2(L)$ is the complex amplitude of the light related to the field intensity at the end of the second core;
$B_o$ is twice pi divided by the wavelength of light injected or launched into the cores;
K is twice pi divided by the beat wavelength;
$u_i$ is a selected location within the interval "i" at which strain is being evaluated;
$E[u_i]$ is the strain at a point within the i-th interval; and
$E'[u_i]$ is the rate of change of $E[u_i]$ with respect to distance at location $u_i$; and
$l_i$ is the distance from the beginning of the waveguide fiber to the i-th interval.

Each element of an increment of distance delta $l_i$ along the waveguide accordingly contributes to the net amount of crosstalk between the two cores 17 and 17'. By choosing infinitesimally small distances delta $l_i$, the relationship can be written as a function of contrast Q related to strain "E". The contrast function Q is based upon the light amplitude in beams 37 and 37' over a range of wavelengths:

$$Q(K) = E(l)/K \cos[2K(L - l)]\Big|_o^L + 2 \int_o^L E(l)\sin[2K(L - l)]\, dl,$$

"l" being distance along the length of the fiber.

FIG. 3 shows the contrast function Q(K) for a uniformly loaded cantilevered beam. This relationship in turn can be inverted with regard to the desired strain distribution by conducting a Fourier transform, to produce an indication of the value of strain E as a function of length along the fiber, as is shown in FIG. 2B for the uniformly loaded beam case.

The above information may lead others skilled in the art to conceive of other versions of the invention, which nonetheless fall within the scope thereof. Accordingly, reference is urged to the claims which follow as these define with particularity, the metes and bounds of the invention.

We claim:

1. A strain sensing apparatus comprising an optical waveguide including first and second light-guiding cores for carrying at least a single mode of light, fixedly mounted with respect to a mechanical structure; a multiwavelength light source for simultaneously launching light into both of said cores for propagation therealong and for providing crosstalk between said cores which modifies the light propagating along each of said cores in a manner dependent on the stressing of said waveguide; and a detection system for responding to the crosstalk between said first and second light-guiding cores, including means for comparing light from said cores to establish a contrast relationship with respect to said wavelengths indicative of the locations and degrees of distributed stresses in said mechanical structure along said waveguide.

2. The strain sensing apparatus of claim 1, further comprising means for operating said multiwavelength light source in such a manner that it issues light at different wavelengths over a period of time.

* * * * *